April 18, 1967
J. R. MOORE, JR
3,315,105
SPEED CONTROL MEANS FOR D.C. MOTORS
AND METHOD FOR MAKING THE SAME
Original Filed April 18, 1963
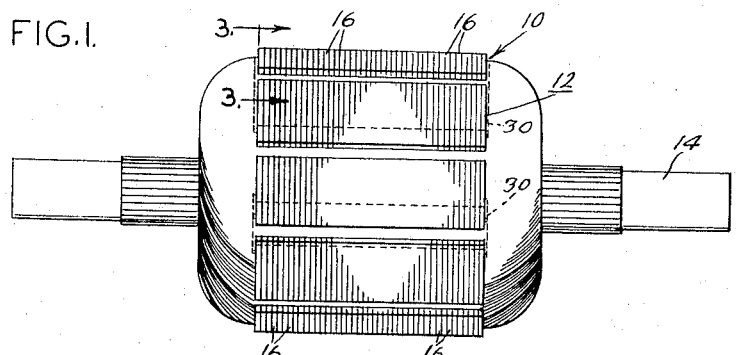
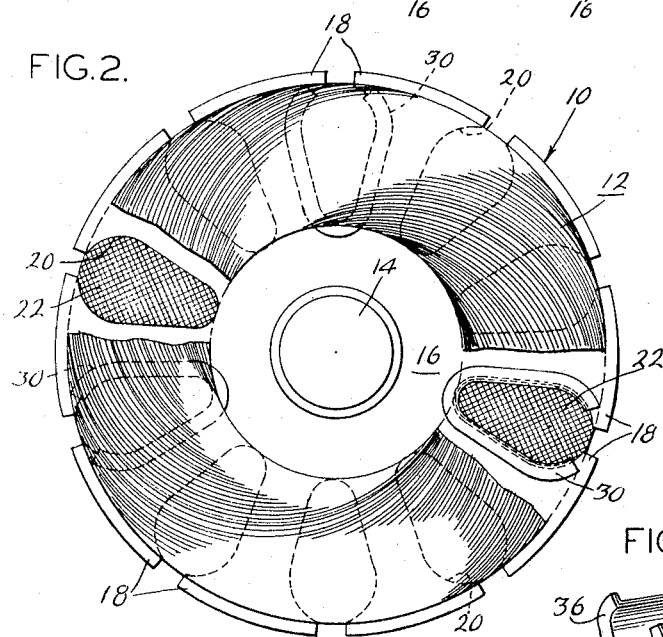
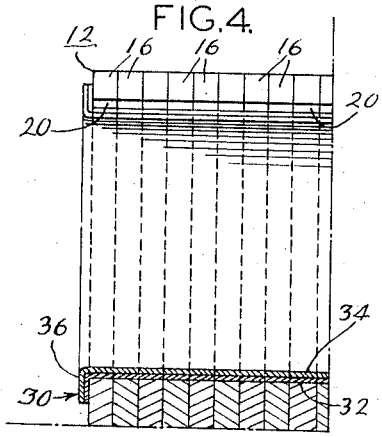
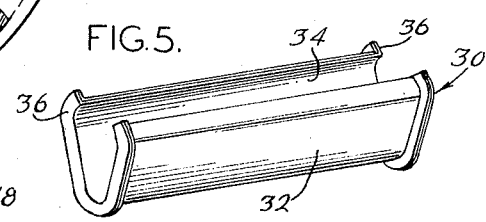
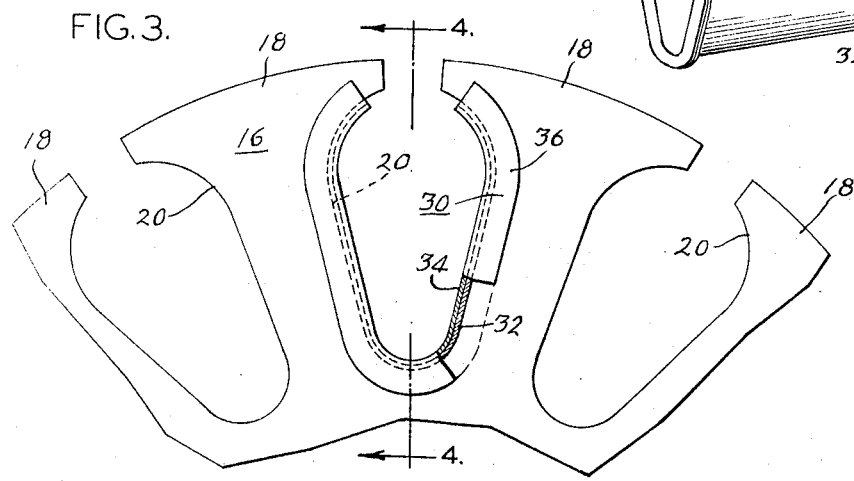
INVENTOR:
JAMES R. MOORE, JR.
BY Howson & Howson
ATTYS.

United States Patent Office 3,315,105
Patented Apr. 18, 1967

3,315,105
SPEED CONTROL MEANS FOR D.C. MOTORS AND METHOD FOR MAKING THE SAME
James Riley Moore, Jr., Columbus, Miss., assignor to American Bosch Arma Corporation, Columbus, Miss., a corporation of New York
Continuation of application Ser. No. 265,961, Mar. 18, 1963. This application Nov. 9, 1965, Ser. No. 510,393
2 Claims. (Cl. 310—211)

This is a continuation application of my prior U.S. application Ser. No. 265,961, filed Mar. 18, 1963, now abandoned for "Speed Control Means for D.C. Motors and Method for Making the Same."

This invention relates to armatures for electric motor apparatus, such as, direct current, series wound electric motor apparatus. More particularly the present invention relates to new and improved armature means for controlling the speed characteristics of such motor apparatus in a manner to prevent "overspeed" or "runaway" conditions when the motor is under comparatively light load or no load and to a method of making such armature means.

O well-known characteristic of direct current, series wound electric motors is that they possess a high stall or starting torque as compared for example, to shunt or compound wound motors and accordingly they are often employed for example in window lift and seat mover installations for automobiles or the like where the load on the motor may vary from a comparatively heavy starting load to a substantially no-load condition. A drawback of the series wound motor in these applications is that it tends to "overspeed" or "runaway" when the load on the motor is comparatively small. When running at excessively high speeds, the series motor tends to be noisy and in some instances there is the possibility of damage to the armature windings.

Various attempts have been made in the past to solve this problem of "runaway" in direct current, series wound motors, but these proposals have not been entirely satisfactory. For example one proposed solution to the problem consists in the use of mechanical means such as a spring or bowed washer engaging the armature shaft to provide a mechanical or friction load thereon. However, since the load imposed by the washer is present regardless of armature speed, it has the disadvantage of loading the armature at times when it is not needed and even not wanted, for example, during initial starting of the motor when high stall or starting torque is desired. In accordance with other attempts to solve the problem, it has been proposed to provide short-circuited armature windings. However, such armature assemblies of the prior art are comparatively expensive to manufacture and in some instances, cut down on the overall performance of the motor and/or cause an unbalanced condition contributing to undue wear on the motor. In still other instances it has been proposed to wedge bars or strips of conducting material forcibly into each of the slots of the armature between the outer tips of the fingers of the rotor assembly and the armature windings. This assembly, however, is comparatively expensive to manufacture.

With the foregoing in mind, it is an object of the present invention to provide a new and improved armature assembly for electric motor apparatus such as direct current, series wound motors which effectively eliminates the danger of "runaway" or "overspeeding" and yet preserves the desired high starting torque characteristic thereby precluding objectionable noises and damage to the motor under little or no-load conditions.

A further object of the present invention is to provide an armature assembly providing speed control means preventing "runaway" which is of comparatively simplified construction so that it may be assembled easily, manufactured economically and which is extremely effective for the purposes intended.

Another object of the present invention is to provide a new and improved method for fabricating in an economical manner an armature incorporating speed control means.

These and other objects of the present invention and the various features and details of the construction and operation thereof are hereinafter more fully set forth with reference to the accompanying drawings, in which:

FIG. 1 is a side elevational view of an armature constructed in accordance with the present invention;

FIG. 2 is an enlarged end view of the armature with parts broken away to show details of the construction of the armature more clearly;

FIG. 3 is an enlarged fragmentary view of a portion of the rotor of the armature;

FIG. 4 is a sectional view taken on line 4—4 of FIG. 3; and

FIG. 5 is a perspective view of a current conducting liner for insertion in one or more of the armature slots.

Referring now to the drawings, there is shown in FIG. 1 an armature 10 for a motor apparatus, such as, a series wound motor which embodies speed control means in accordance with the present invention. The armature 10 comprises a rotor assembly 12 mounted on a shaft 14. The rotor assembly 12 consists of a laminated core structure comprised of a plurality of thin laminations or plates 16 as shown in FIG. 4, each having a plurality of radially extending, circumferentially spaced, T-shaped fingers 18. The fingers 18 of the laminations of the core structure are aligned to provide a plurality of axially extending U-shaped slots 20 to receive the armature windings such as 22.

It has been found that when the armature 10 rotates in a magnetic field in a motor assembly, a voltage is induced in the laminations 16 of the rotor assembly which results in a current flow within each lamination 16 and from lamination to lamination. This induced current flow produces a magnetic field opposing the normal magnetic field of the armature windings 22 which causes the armature to rotate thus tending to slow the motor. The amount of induced current flow in the laminations 16 of the rotor assembly is proportional to the speed at which the armature 10 rotates and hence the slowing action becomes higher at higher speeds. However, even though the laminations are mounted in close face-to-face relation, there is a comparatively poor electrical contact between the laminations due, for example, to small particles therebetween and surface irregularities in the confronting surfaces of adjacent laminations. Accordingly, the magnetic field produced by the induced current flow in the laminations 16 is comparatively weak and does not appreciably affect the normal magnetic field of the armature windings 22 and actually does not slow down the motor. Thus under small or no-load conditions, the motor has a tendency to "overspeed" or "runaway."

In accordance with the present invention, means is provided for decreasing the electrical resistivity of the laminations 16 of the rotor assembly 12 in a direction parallel to the slots 20 thereby to increase the induced current flow in the rotor assembly, thus providing a magnetic field opposing the normal magnetic field of the armature windings 22 which not only increases proportionately with increased armature speed, but is of a sufficient magnitude at high armature speeds to prevent "runaway." Accordingly an effective speed control of the armature is provided by the induced magnetic field, the maximum control occurring at the higher speeds of the armature where the danger of "runaway" or "overspeeding" exists, while the opposing magnetic field being minimal at the lower speeds to preserve the high stall or starting torque characteristics of the motor. In the present instance this is accomplished by providing a current conducting member in the form of a liner 30 in one or more of the axial slots 20 in contact with the surface of each of the laminations facing the slot. In the present instance, the liner 30 comprises a thin, flexible layer 32 of a material having high electrical conductivity, such as copper, of a suitable size and shape to engage substantially the entire edge surface of the adjacent fingers 18 of the laminations 16 forming an axial slot 20, and a sheet 34 of insulating material such as paper of substantially the same size and shape as the layer 32 disposed between the armature windings 22 and the layer 32. In the present instance the sheet 34 of insulating material and the layer 32 of conducting material are bonded together to form an integral assembly. However, they may be separate elements.

In accordance with the present method of assembling the armature 10, the laminations 16 are pressed onto the shaft 14 with the fingers 18 aligned to define the axial slots 20. Thereafter the liner 30, composed of the thin layer 32 of copper or the like and sheet of paper 34, which is generally rectangular in form is bent so that it is generally U-shaped in cross section and then inserted into at least one of the axial slots 20. The outer ends of the liner are then crimped outward to provide turned back end edges 36 overlying the end face of the laminations at outer ends of the core structure as shown. Thereafter, the armature windings 22 are wound on to the laminated core in the conventional manner. During assembly of the windings 22, the layer 32 of the liner 30 is pressed into close engagement with the edges of the laminations 16 facing the slot 20, thus decreasing the electrical resistivity of the core structure and providing for good flow of the current induced in the laminations, the sheet 34 serving to insulate the armature windings from the layer 32 of conducting material.

By this arrangement the layer 32 of conducting material, which is in intimate contact with each of the laminations 16 of the stack, serves to short circuit each lamination 16 to the next adjacent lamination 16 thus decreasing the total electrical resistivity of the laminated core. By thus decreasing the electrical resistivity, the resistance to flow of the induced current flow is decreased. Accordingly, as the armature rotates in a magnetic field, a relatively strong current is induced in the laminated core which produces a magnetic field opposing the normal magnetic field of the armature windings, the induced magnetic field being proportional to the armature speed. At high armature speeds, the effect of the induced magnetic field opposing the normal magnetic field is greatest, thereby to prevent "runaway" or "overspeeding." In the illustrated embodiment, a liner 30 is provided in each of three slots 20 of the rotor assembly. If desired, a lesser or greater number of liners 30 may be employed depending on the speed control wanted.

The improved induced current flow provided by the liner 30 may also be employed advantageously in applications where motor apparatus is required to provide dynamic braking. The dynamic braking referred to is provided by the current generated within the motor apparatus in the absence of externally applied armature winding current, which tends to arrest turning of the armature. In the present instance, the improved current flow in the laminations tends to increase the rate of deceleration of the armature thus providing dynamic braking. In this regard it is of course to be understood that when used to effect dynamic braking, the liner may be used in motors other than direct current, series wound motors.

While a particular embodiment of the present invention have been illustrated and described herein, it is not intended to limit the invention to such disclosure and changes and modifications may be made therein within the scope of the following claims.

I claim:
1. A balanced rotor assembly for an armature comprising a core structure including a plurality of laminations each having a plurality of spaced apart fingers, said laminations arranged in face-to-face relation with the fingers aligned to define a plurality of slots extending transversely of the laminations, a plurality of circumferentially equispaced liners mounted in said slots, said liners being of substantially the same configuration and weight and all of said liners being substantially equispaced from the axis of rotation of said rotor, at least one of said liners being a thin laminated liner consisting of a thin layer of electrically conductive material having one face in contact with a plurality of said laminations and a thin sheet of insulating material confronting and bonded to the face of said layer opposite said one face and an armature winding in said slots pressing said one liner into engagement with said laminations thereby to decrease the electrical resistivity of said core structure, said one liner having an open side aligned with the slot and being readily deformable under the pressure of the windings and said windings being tightly wound whereby the direct contact between the layer of electrically conductive material of said one liner and said laminations constitutes the sole electrical connection therebetween and said winding being exposed through said slots.

2. A balanced armature assembly comprising a shaft, a plurality of laminations defining a core structure mounted in face-to-face relation on said shaft, each of said laminations having a plurality of radially extending, circumferentially spaced fingers, the fingers of said laminations of said core structure aligned to define a plurality of slots extending transversely of the laminations, a plurality of circumferentially equispaced liners mounted in said slots, said liners being of substantially the same configuration and weight and all of said liners being substantially equispaced from the axis of rotation of said rotor, at least one of said liners being a thin laminated liner consisting of a thin layer of electrically conductive material having one face in contact with a plurality of said laminations and a thin sheet of insulating material confronting the face of said layer opposite said one face, said one liner being generally of U-shaped cross section with the open side aligned with the slot and having at each opposite end thereof a turned-back flange portion adapted to overlie the end face of the laminations at each end of the core structure thereby to provide a good electrical connection at opposite ends of the core structure, and an armature winding in said slots pressing said one liner into engagement with said lamination thereby to decrease the electrical resistivity of said core structure, said one liner being readily deformable under the pressure of the windings and said windings being tightly wound whereby the direct contact between the layer of electrically conductive material of said one liner and said laminations constitutes the sole electrical connection therebetween.

References Cited by the Examiner

UNITED STATES PATENTS

| | | | |
|---|---|---|---|
| 493,025 | 3/1893 | Hassler | 310—265 |
| 1,316,798 | 9/1919 | Lamme | 310—183 |
| 1,974,406 | 9/1934 | Apple | 310—217 |
| 2,483,066 | 9/1949 | Sigmund et al. | 310—215 |
| 3,130,335 | 7/1964 | Rejda | 310—215 |

MILTON O. HIRSHFIELD, *Primary Examiner.*

M. L. LEVY, L. L. SMITH, *Assistant Examiners.*